US011142259B2

(12) United States Patent
Cooper (10) Patent No.: US 11,142,259 B2
(45) Date of Patent: Oct. 12, 2021

(54) MUD FLAP SUSPENSION APPARATUS AND METHOD OF USE

(71) Applicant: William M Cooper, Hereford, TX (US)

(72) Inventor: William M Cooper, Hereford, TX (US)

( * ) Notice: Subject to any disclaimer, the term of this patent is extended or adjusted under 35 U.S.C. 154(b) by 85 days.

(21) Appl. No.: 16/676,228

(22) Filed: Nov. 6, 2019

(65) Prior Publication Data

US 2020/0140020 A1 May 7, 2020

Related U.S. Application Data

(60) Provisional application No. 62/766,855, filed on Nov. 7, 2018.

(51) Int. Cl.
*B62D 25/16* (2006.01)
*B62D 65/16* (2006.01)

(52) U.S. Cl.
CPC ......... *B62D 25/166* (2013.01); *B62D 25/161* (2013.01); *B62D 25/168* (2013.01); *B62D 65/16* (2013.01)

(58) Field of Classification Search
CPC .. B62D 25/166; B62D 25/168; B62D 25/188; B62D 25/161; B62D 25/18; B62D 25/182; B62D 65/16
See application file for complete search history.

(56) References Cited

U.S. PATENT DOCUMENTS

| | | | | | |
|---|---|---|---|---|---|
| 1,993,067 | A | * | 3/1935 | Littlefield | B62D 25/18 280/851 |
| 2,270,266 | A | * | 1/1942 | Cavanagh | B62D 25/18 280/850 |
| 3,700,260 | A | * | 10/1972 | Moore | B62D 25/188 280/851 |
| 3,782,757 | A | * | 1/1974 | Juergens | B62D 25/163 280/851 |
| 3,934,901 | A | * | 1/1976 | Hammerly | B62D 25/188 280/851 |
| 4,326,727 | A | * | 4/1982 | Rock | B62D 25/18 248/316.7 |
| 4,335,862 | A | * | 6/1982 | Sherman | B62D 25/188 248/289.11 |
| 4,354,690 | A | * | 10/1982 | Hanson | B62D 25/188 280/851 |
| 4,487,422 | A | * | 12/1984 | Turunen | B62D 25/18 280/851 |

(Continued)

*Primary Examiner* — Steve Clemmons
(74) *Attorney, Agent, or Firm* — Lamon Patent Services; Cynthia S. Lamon (57) ABSTRACT

A mud flap system is provided comprising a mounting device having a top and bottom including a walled recess extending into an inner volume of the mount and exiting out the bottom. The assembly also includes an elongated suspension bracket having a proximal end to the recess, a distal end defining a length and a thru slot running along the length, a stem extending from a bottom of the bracket at the proximal end, enabled to be inserted into the recess and out of the mounting device. A mud-flap is provided having a top having a thickness and a bottom of the mud flap is inserted through the slot and the thickness at the top suspends the mud flap until force applied to the mud flap causes the thickness at the top to deform and pass through the slot thereby releasing the mud flap from the suspension bracket.

10 Claims, 5 Drawing Sheets

(56) References Cited

U.S. PATENT DOCUMENTS

| | | | | |
|---|---|---|---|---|
| 5,044,667 | A * | 9/1991 | Manning | B62D 25/188 |
| | | | | 280/851 |
| 5,915,708 | A * | 6/1999 | Silva | B62D 25/188 |
| | | | | 280/154 |
| 6,131,747 | A * | 10/2000 | Kin | A47F 7/163 |
| | | | | 211/45 |
| 6,471,228 | B2 * | 10/2002 | Hawes | B62D 25/168 |
| | | | | 248/352 |
| 7,226,086 | B2 * | 6/2007 | Haynes | B62D 25/188 |
| | | | | 280/154 |
| 7,578,526 | B2 * | 8/2009 | Jaeger | B60R 13/04 |
| | | | | 280/154 |
| 7,607,698 | B2 * | 10/2009 | Cicansky | B62D 25/188 |
| | | | | 280/154 |
| 7,654,574 | B2 * | 2/2010 | Haynes | B62D 25/188 |
| | | | | 280/851 |
| 8,579,314 | B2 * | 11/2013 | Prazen | B62D 25/188 |
| | | | | 280/154 |
| 8,905,418 | B2 * | 12/2014 | Dixon | B62D 25/188 |
| | | | | 280/154 |
| 9,045,174 | B2 * | 6/2015 | Dixon | B62D 25/182 |
| 9,963,174 | B1 * | 5/2018 | Cooper | B62D 25/182 |
| 2008/0185809 | A1 * | 8/2008 | Archer | B62D 25/188 |
| | | | | 280/154 |

* cited by examiner

MUD FLAP SUSPENSION APPARATUS AND METHOD OF USE

CROSS-REFERENCE TO RELATED DOCUMENTS

The present application claims priority to a U.S. provisional application 62/766,855 filed Nov. 7, 2018. All disclosure of the provisional application is incorporated herein at least by reference.

BACKGROUND OF THE INVENTION

1. Field of the Invention

The present invention is in the field of truck and trailer accessories and pertains in particular to methods and apparatus for mounting and replacing mud flaps.

2. Discussion of the State of the Art

Mud flaps are protective devices provided for commercial vehicles to protect rearward drivers from debris ejected from behind the commercial vehicle by the tires of that vehicle. A typical mud flap is a somewhat flexible flap that functions as a protective shield with some give for preventing debris like rocks, metal debris, or other objects from being kicked up into any vehicle and windshield that is following behind the vehicle with mud flaps.

Typically, a mud flap is provided for the rear right and rear left tires and may be suspended behind the tire coming to within one to a few inches above the roadway. Mud flaps are generally held in place by hard metal brackets mounted to the frame or fender and the mud flaps are generally mounted to those brackets in a manner requiring tools to install, repair and/or replace those mud flaps. A draw back to this is that more down time exists for drivers having damaged mud flaps that require replacement.

Therefore, what is clearly needed is a mud flap and mounting system that enables the mud flap to break away from the mounting bracket upon enough force and wherein the same flap, replacement parts, or a spare flap might be simply and quickly reattached into mounted position to correct the situation.

BRIEF SUMMARY OF THE INVENTION

A mud flap system is provided in one embodiment, comprising a mounting device having 5 a top, bottom, front, back and two opposing sides enabled to mount to a vehicle, the top including a walled recess extending into an inner volume of the mount and exiting out the bottom. An elongated suspension bracket is also provided having a top, bottom and a proximal end to the recess, a distal end defining the length and a slot thru the top and bottom running along the length of the suspension bracket. In this 10 embodiment, a stem at the proximal end of the bracket near the recess is enabled to be inserted into the recess extending past the bottom of the mounting device.

A mud-flap is provided having a front, back, top with a width extending to a planar body having a bottom and two opposing edges, the top having a thickness greater than a thickness of the body. In this embodiment, the mud flap is manufactured of pliant material and the bottom of the mud flap is inserted through the slot and the thickness at the top extends above the top of the suspension bracket and extends outside of boundaries formed by the slot which suspends the mud flap in the slot until force applied to the mud flap causes the thickness at the top to deform and pass through the slot thereby releasing the mud flap from the suspension bracket.

In one embodiment the mud flap comprises a rib protruding under the top thickness along the width, the suspension bracket between the top thickness and the rib of the bracket, thereby locking the mud flap in position. In this embodiment, the distal end of the stem includes a thru hole enabled to accept pinning hardware preventing the stem from leaving the recess.

A bend stop stem may be provided in this embodiment, which protrudes from the bottom of the suspension bracket in a position between the stem and the slot and the thickness at the top extends past a front and back edge of the suspension bracket. Additionally, the mud flap assembly may be mountable to a vehicle behind at least one tire. The mud flap may be fabricated from a flexible rubber, neoprene or rubber and polymer composite material and the top thickness of the mud flap is not damaged after being forced through the slot.

A method of suspending and detaching a mud flap is provided, comprising the steps of attaching a mounting device to a vehicle near a back side of a vehicle wheel, inserting a stem protruding from one end of an elongated suspension bracket into a recess formed at a top side of the mounting device, the stem exiting out a bottom of the mounting device, inserting a mud flap through a slot formed along a length of the suspension bracket, the mud flap suspended in the slot via a thickness at a top edge of the mud flap being greater than a thickness of the slot. In this embodiment, when enough force is applied to the mud flap, the thickness at the top edge is dislodged and forced through the slot, although not damaged.

DETAILED DESCRIPTION OF THE INVENTION

In various embodiments described in enabling detail herein, the inventor provides a unique mud flap suspension system which may be removed and replaced by hand requiring no tools. It is a goal of the present invention to provide a break-away mud flap system wherein the mud flap may be forced out of the bracket upon encountering damaging force from a tire thrown object without damage to the mud flap suspension bracket. It is also a goal of the present invention to provide a break-away mud flap system wherein the assembly, including the 5 suspension bracket and mud flap replacement, can be made by hand with no tooling. It is a further goal of the present invention to provide a damage mitigating feature that reduces the probability of damage to the mud flap suspension bracket in the event of a mud flap ejection. The present invention is described in enabling detail using the following examples, which may describe more than one 10 relevant embodiment falling within the scope of the present invention.

Figure 1:
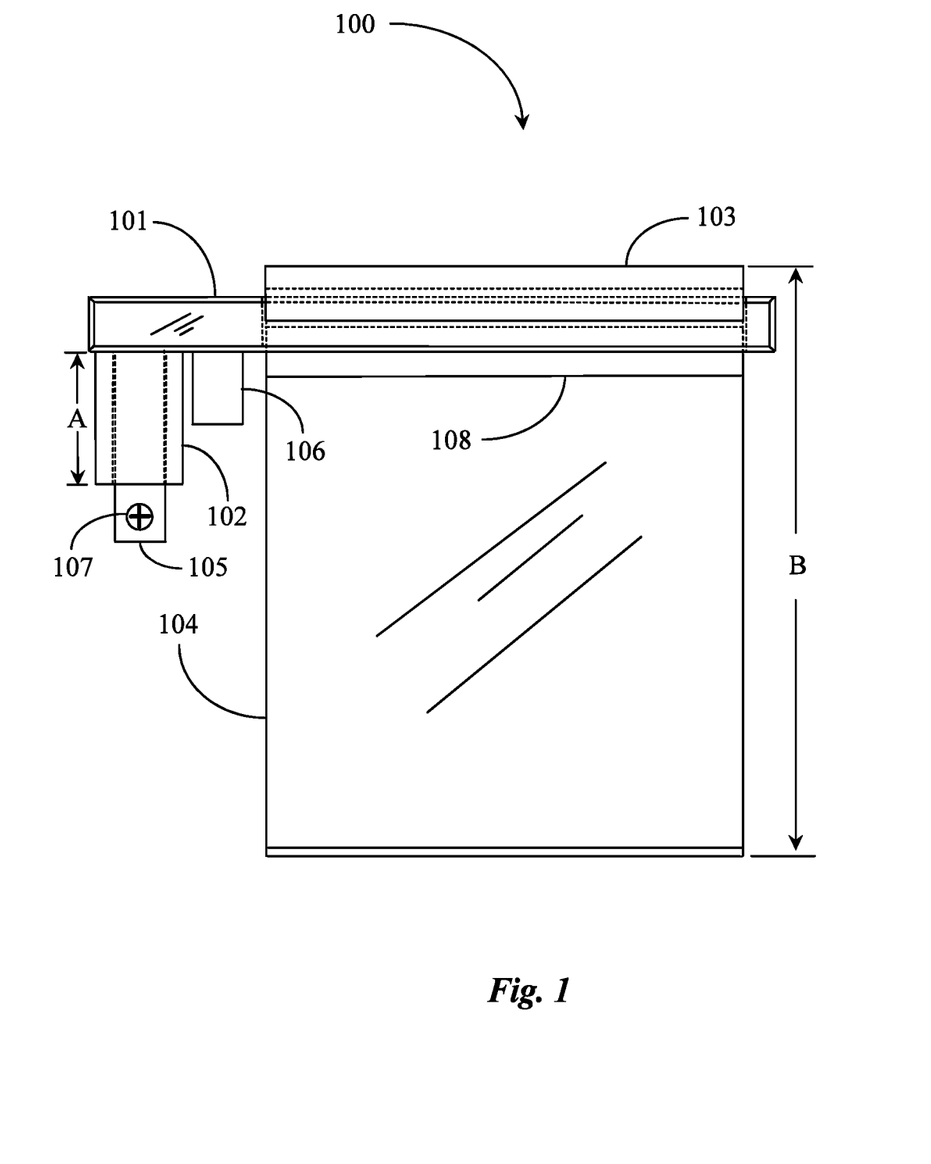
FIG. 1 is an elevation view of a right-side mud flap mounting bracket suspending a mud flap in position according to an embodiment of the present invention.

FIG. 1 is an elevation view of a right-side, passenger side, mud flap mounted bracket assembly 100 suspending a mud flap in position according to an embodiment of the present invention. Mud flap mounted bracket assembly 100 may be referred to hereinafter as mud flap assembly 100. Mud flap assembly 100 includes a mud flap suspension bracket 101 that may be seated snugly into a bracket mount hardware block 102 having an internal seat or recess. The mounting block 102 may be welded to or otherwise fixed to the frame of a truck trailer or other vehicle requiring or having mud flaps as a safety feature.

Mud flap assembly 100 is a right-side assembly. The left side, driver's side, mud flap assembly includes the same (interchangeable) parts arranged in mounting and assembly for the left side of the vehicle in a mirror image. Mounting block 102 may comprise a stainless-steel square block of several inches in length welded to or otherwise fixed vertically to the vehicle frame (not illustrated). The internal seat may be rectangular or circular and extends completely through the mounting block 102 through the top and out the bottom of the mounting block 102. In one embodiment mounting block 102 is a hollow steel block having a vertically aligned rectangular passage or seat fabricated through the center of the block 102 by drilling a through hole and broaching the hole to size to allow the bracket stem 105 of the suspension bracket 101 to be inserted through the block 102 and out of the bottom of the block 102. In another aspect, mounting block 102 may be a rectangular extruded tube having an inside diameter for seating bracket stem 105.

Bracket 101 may be a stainless-steel rectangular block having a central slot 109 provided vertically of a width dimension just larger than the thickness of a mud flap 104 and a length dimension just longer that the width dimension of the mud flap 104. The elongated through slot 109 in suspension bracket 101 functions to suspend the mud flap 104, enabling the mud flap 104 to hang vertically down at the correct height positioning parallel to the frame of the vehicle supporting the suspended mud flap 104. Bracket 101 has a rectangular bracket stem 105, depicted extending through the vertical seat in mounting block 102. Bracket stem 105 may be a solid rectangular tube or rectangular extruded rod fabricated of steel and may be welded to or otherwise securely fixed to bracket 101 orthoganally from the direction of the bracket 101 and parallel to a suspended mud flap 104.

Suspension bracket 101 also includes a bend-stop stem 106 welded to or otherwise securely fixed to suspension bracket 101 just ahead of bracket mounting stem 105. Bend-stop stem 106 may be a rectangular steel rod welded or otherwise securely fixed orthogonally to suspension bracket 101 in line with the mud flap suspension slot 109. The utility of bend-stop 106 is to prevent force on the suspended mud flap 104 from bending or otherwise deforming or compromising the lateral positioning of the bracket 101. A small gap is provided between mounting stem 105 and bend-stop stem 106 to provide enough space to prevent the components from binding making it more difficult to remove bracket 101 from mounting block 102.

Bracket mounting stem 105 of suspension bracket 101 has a through hole placed centrally through the block perpendicular to the plane of a suspended mud flap 104. The through hole has a diameter just larger than a cotter pin, screw, or other pinning hardware 107 to prevent bracket 101 from backing out of its seated position in mounting block 102. Mounting block 102 has a vertical length A of approximately four inches. Mounting stem 105 is longer by one or more inches leaving room for pinning hardware 107 to lock bracket 101 in a position to suspend mud flap 104.

Mud flap 104 may be a standard mud flap fabricated from a flexible rubber, neoprene or rubber and polymer composite material. Mud flap 104 has a break away suspension head 103 running the width of mud flap 104 and overlapping the mud flap 104 at both front and rear sides thereof. Suspension head 103 may be fabricated of a lighter rubber or polyurethane foam material that is collapsible like a foam sponge material and resilient so it may retake original form after collapsing. Suspension head 103 may be connected to the top edge of mud flap 104 by gluing, clamping, or riveting along the top edge of mud flap 104. Suspension head 103 is significantly wider than the elongate mud flap suspension slot 109 in bracket 101 but, due to its ability to collapse, may be pulled down and through the slot 109 given adequate force.

The side profile of mud flap suspension head 103 may be any geometric shape; however, a split-wing shape having a score line down the center is one preferred application. In the split wing architecture, the mud flap suspension head 103 flows over both sides of bracket 101 and is securely attached along centerline to the top edge of mud flap 104. The bond between the material of mud flap 104 and the material of the mud flap suspension head 102 is strong enough to resist normal suspension weight of the mud flap 104, winds against the mud flap 104, weather affecting the mud flap 104, and typical small objects and debris obstacles that could come into contact with the mud flap 104.

The overall height B of mud flap assembly 100 is approximately 3 feet. However, different vehicles may require mud flaps 104 of different heights and widths depending on tire diameter, number of tires covered, and the like. In one embodiment, bracket 101 may be adjusted for some length extension and then locked at that extension. In this embodiment the mud flap 104 may come oversized and may be trimmed along score lines to attain a desired width and length. In general manufacturers may provide the components as a kit that may be sized appropriately for the make and model of vehicle the mud flaps 104 will suspend from.

Mud flap 104 includes a locking rib 108. Locking rib 108 is a thicker portion of mud flap 104 extending across the top of the mud flap 104 proximal to the top edge of the mud flap 104 that binds with the mud flap 104 suspension head 103. The offset in thickness is centered over the top edge of the mud flap 104 and is held at the same or just larger thickness than the bracket suspension slot 109. Locking rib 108 may be pulled through the bracket slot 109 but at a much higher force than the rest of the mud flap 104. In this implementation, locking rib 108 prevents mud flap 104 from backing up through the suspension slot 109 in bracket 101 due to converse winds, vibration, obstacle contact or a combination thereof. The bottom edge of mud flap 104 may be chamfered, rounded or molded to be thicker that the nominal thickness of the mud flap 104 for weight distribution. However, the locking rib 108 has the widest thickness dimension for mud flap 104.

In general use of the present invention, suspension bracket 101 is inserted via bracket stem 105 into the seat of the mounting block 102 (welded to frame) and is pinned on the bottom side of the mounting block with pin 107 to lock the bracket 101 in place and in position to suspend a mud flap 104. A mud flap 104 having a collapsible suspension head 103 is inserted down into the seated and locked suspension bracket 101 through the provided center suspension slot 109. The suspension head 103 prevents the flap from falling through suspension slot 109 and allows for sturdy suspension of the mud flap 104.

Figure 2:
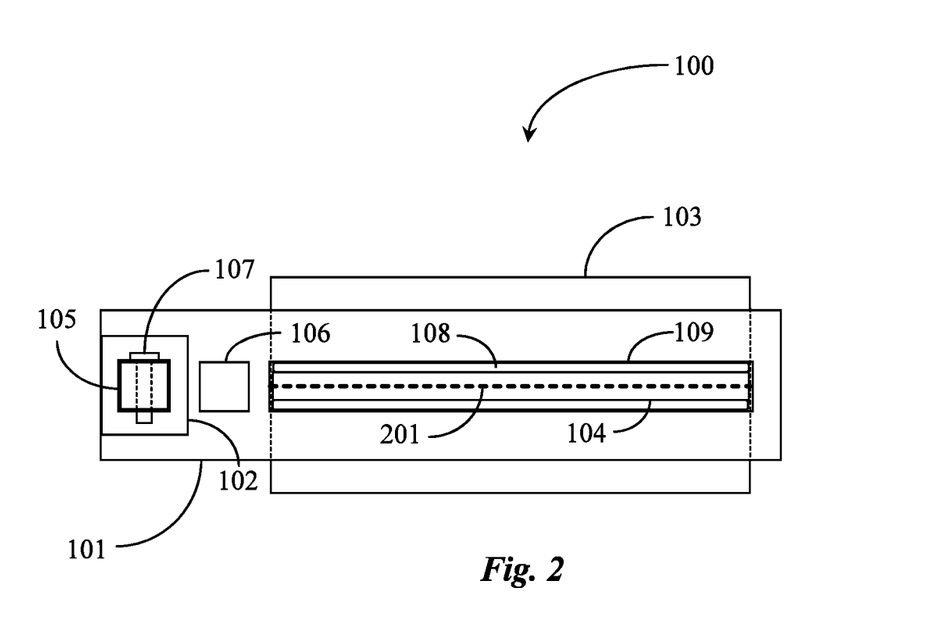
FIG. 2 is an underneath view of the right-side mud flap mounting bracket and installed mud flap of FIG. 1.

FIG. 2 is an underneath view of the right-side mud flap mounting bracket assembly 100 and installed mud flap 104 of FIG. 1. Mud flap assembly 100 in this view depicts mud flap suspension head 103 as roughly equal with respect to overall length to the bracket suspension slot 109. Locking rib 108 may take up the full width of the suspension slot 109 and is inserted through the suspension slot 109 under some force as it may make frictional contact with the internal walls of the suspension slot 109. The resiliency of the mud flap 104 material makes it possible to push the locking rib 108 through suspension slot 109 and then have it retake shape to prevent it from coming back through the suspension slot 109.

Mud flap 104 hangs down in the middle of suspension slot 109. In one embodiment, suspension head 103 includes a center score that is strong enough to enable evacuation of the mud flap 104 through the suspension slot 109 upon enough force wherein the suspension head 103 is still attached to the mud flap 104 and not damaged. However, under more dire circumstance the force may be great enough to take the mud flap 104 and tear it from the suspension head 103. In such a case the user may simply install a spare mud flap 104 to replace the damaged mud flap 104.

Mounting block 102 provides rigid support for suspension bracket 101 and bend-stop stem 106 provides protection against deformation of the suspension bracket 101 in certain cases where down force might bend it. Suspension bracket 101 may be a plate bracket that is welded together from steel plate and that may be hollow or have a hollow space inside to lessen the weight of the bracket. In such a case, suspension slot 109 may include plates welded vertically to the top and bottom plates in the area of the suspension slot 109 to form the walls of slot 109.

A user may remove pin 107 and then lift bracket 101 straight up to remove the suspension bracket 101 and suspended mud flap 104 from mounting block 102. Likewise, a user may lift a mud flap 104 up out of suspension slot 109 with enough force that may be required to pull the locking rib 108 back out of the suspension slot 109. The width of the locking rib 108 may be the same or just larger than the width of the suspension slot 109 causing frictional contact between the locking rib 108 and the internal walls of the suspension slot 109. Suspension slot 109 is bounded on all sides so that mud flap 104 stays in position at center behind the tires.

Figure 3:
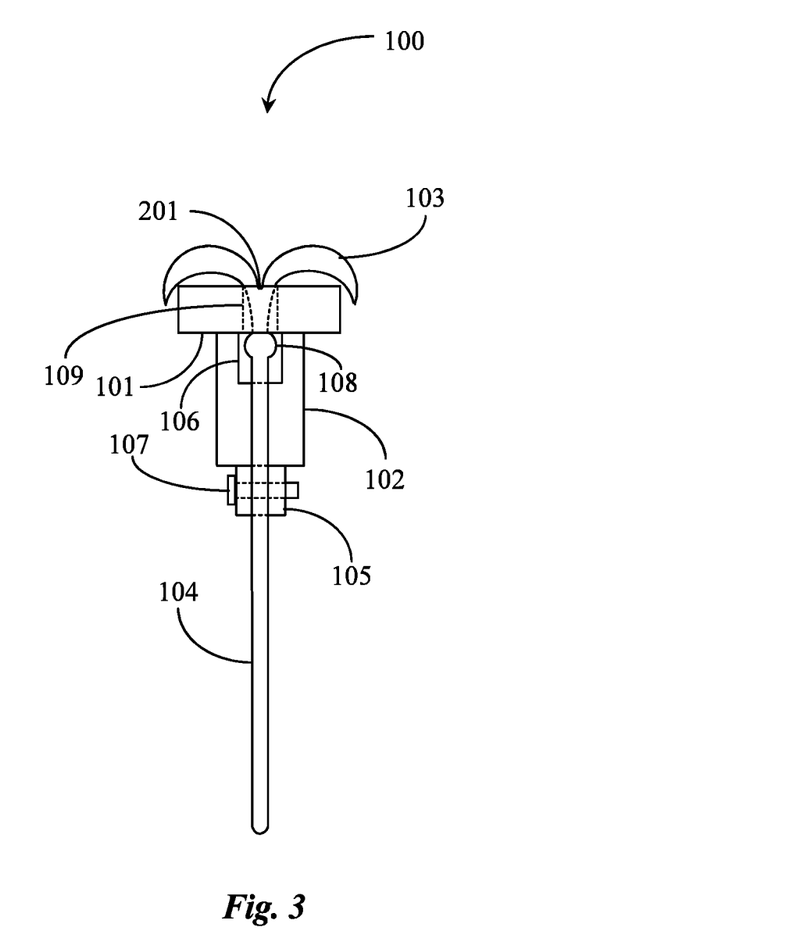
FIG. 3 is a right-side edge view of the right-side mud flap mounting bracket and mud flap of FIG. 1.

FIG. 3 is a right-side edge view of the right-side mud flap mounting bracket assembly 100 of FIG. 1. Mounting block 102 shares a same centerline with rectangular suspension bracket 101 and the suspended mud flap 104. However, this is not a requirement to practice the present invention. In one embodiment, mounting block 102 may be flush to the rear side of the bracket. In a preferred embodiment, the mounting block 102 shares the center line of suspension bracket 101 to provide stability such that the suspension bracket 101 does not twist.

In this view, one may see the profile shape of mud flap suspension head 103 described as a split wing shape or edge profile. Score 201 separates each wing of the collapsible suspension head. Each wing extends equally past the width of suspension bracket 101. Suspension head 103 may have different forms without departing from the spirit and scope of the present invention. The split wing design depicted in this embodiment enables the head to be collapsed upon itself and be pulled through the much thinner suspension slot 109 in the suspension bracket 101 without damaging or deforming the suspension head 103 so the mud flap 104 may be retrieved and re-inserted into the suspension slot 109. Other shapes that are symmetrical on both sides of the suspension slot 109 may also be acceptable and may collapse through the suspension slot 109 appropriately when the force is enough to pull it through.

In one embodiment, the stiffness of the material used to manufacture the suspension heads 103 may be created in the molding process and may be regulated to a certain or specific density that may be deemed most suitable for the application. In this same embodiment, the method of attaching the suspension head 103 to the mud flap 104 may be closely regulated to achieve a bond that may withstand factory pull tests through a suspending slot 109.

Figure 4:
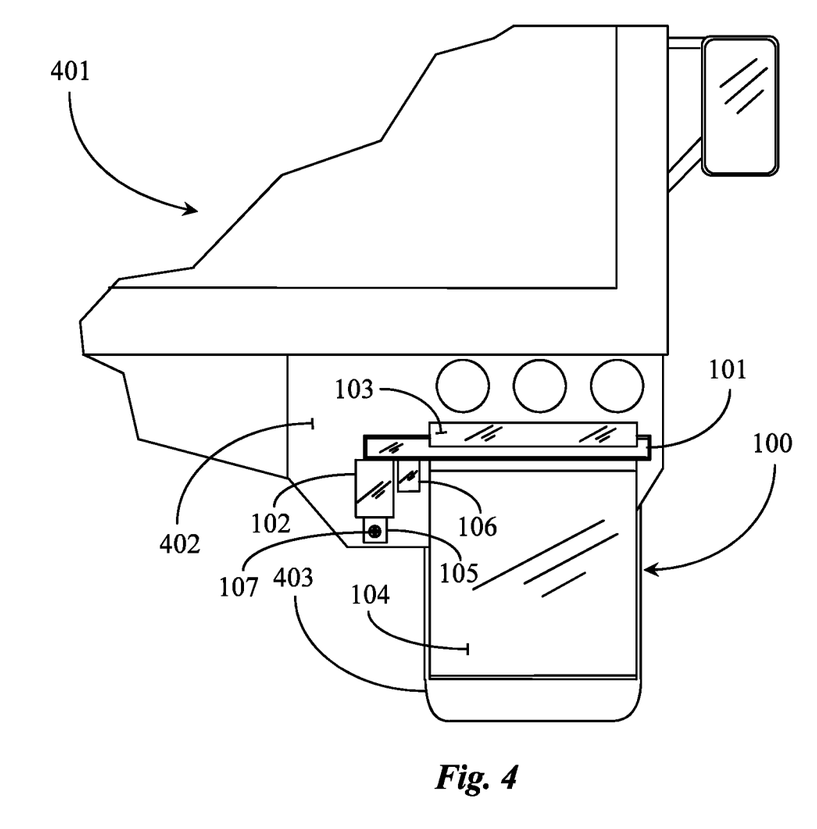
FIG. 4 is a rear elevation view of the right-side mounting bracket and mud flap of FIG. 1 mounted on a vehicle frame.

FIG. 4 is a rear elevation view of the right-side mounting bracket assembly 100 of FIG. 1 mounted on a truck or trailer frame 402. In this view, the entire mud flap assembly 100 is depicted in mounted position on the right rear end of a truck or trailer vehicle 401. Mud flap 104 is suspended behind the truck tire or tires 403. Assembly 100 is mounted to truck frame 402 to the right of a center hitch or other implements. Collapsible suspension head 103 is depicted in resilient form atop suspension bracket 101 and overlapping the suspension bracket 101 on both sides. Suspension bracket 101 is held in place by bracket stem 105 extending down and through mounting block 102. Pin 107 prevents the suspension bracket 101 from lifting out of the mounting block 102.

In general use, while driving if an object strikes mud flap 104 and pulls it out of bracket 101 and the collapsible suspension head is still intact. The driver may pull over and retrieve the mud flap 104 and simply install it back into suspension bracket 101. If the collapsible head or mud flap 104 is damaged beyond reasonable use, the driver may simply install a spare mud flap 104 into suspension bracket 101. In one embodiment of the invention, a small sensor may be placed at the sight of each suspended mud flap 104 with an electronic connection to a light or buzzer in the cab of the truck or trailer that may alert a driver of a lost mud flap 104 in real time. The sensor may be an optical sensor or a motion sensor, or another sensor that may detect sudden displacement of a suspending mud flap 104. In another embodiment, mud flaps may be easily installed or switched out of the suspension bracket in order to display an advertisement or specific logo or design that may represent a company, etc.

In another implementation of the invention, suspension bracket 101 may be designed mechanically to enable clamp down on the suspended mud flap 104 locking the mud flap 104 into the suspension bracket 101 such that it may not be removed without releasing the clamp. The suspension bracket 101 may also be locked into mounting block 102 such that a clamping mechanism may be controlled by a linear actuator or a hydraulic pressure system operable from inside the cab of a truck or trailer. Locking the suspension bracket 101 to mounting block 102 and clamping the suspended mud flaps 104 in locked position in suspension bracket 101 may deter theft of the entire assembly or in case that the suspension bracket 101 is locked to the mounting block 102, the individual mud flaps 104 will hang in place. In one embodiment where suspension bracket 101 is locked to mounting block 102, which may be welded to frame 402 of vehicle 401, the locking mechanism is a simple lock and key used in place of pin 107.

Figure 5:
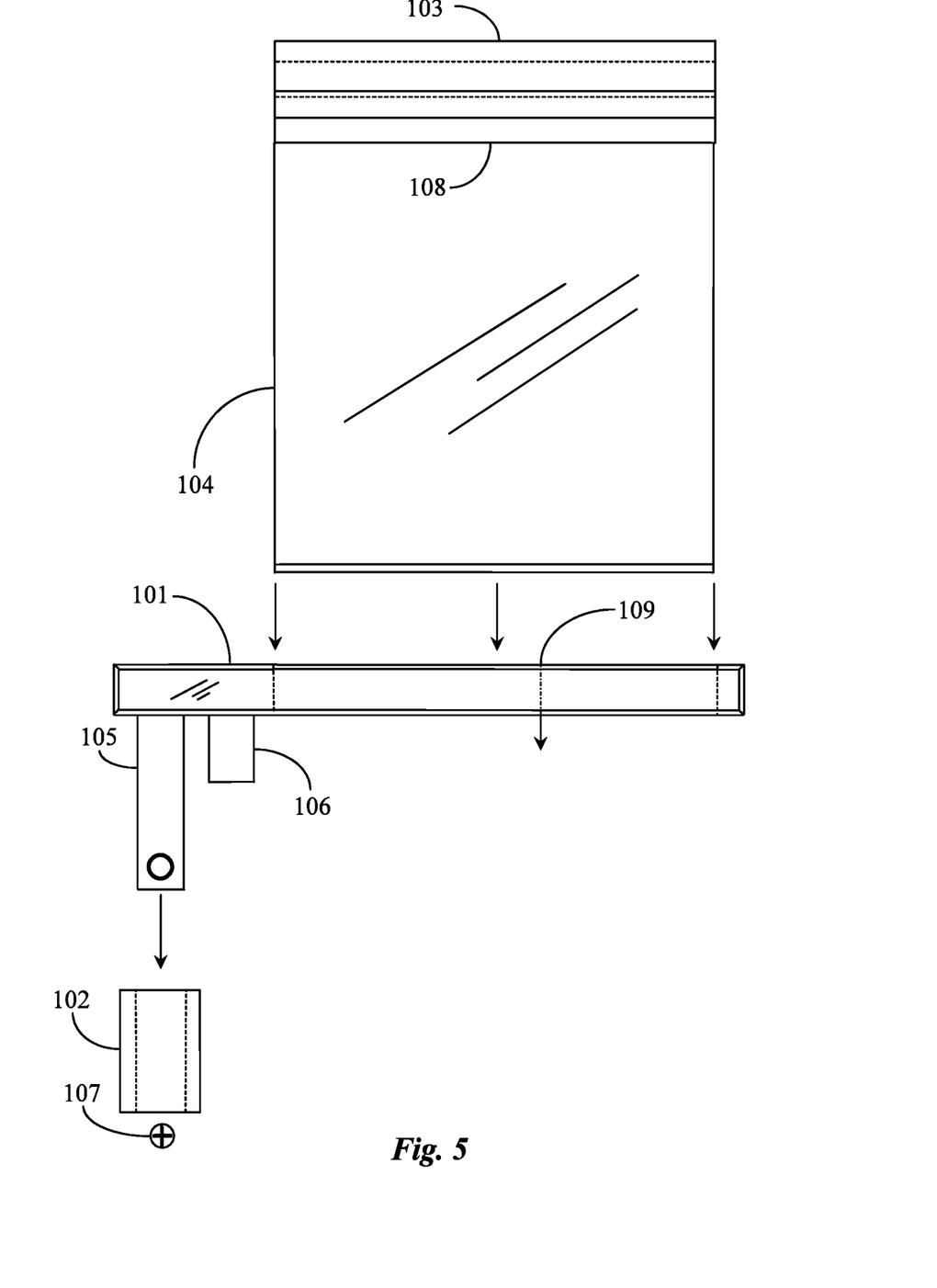
FIG. 5 is an exploded view of the right-side mounting bracket and mud flap of FIG. 1 depicting the three primary components separately.

FIG. 5 is an exploded view of the right-side mounting block 102, suspension bracket 101, and mud flap 104 of FIG. 1 in alignment for tool-free assembly. In this view the main components of the mud flap system of the invention are depicted separately. Mounting block 102 (lower left) is welded to frame and includes a vertical stem seat opening (parallel broken lines) placed through the block approximately centered for bracket stem 105 of suspension bracket 101.

The stem seat of mounting block 102 is square and has an inside dimension just larger than the outside dimension of bracket stem 105 which is also square. The stem seat of suspension bracket 105 and suspension bracket 101 may be rectangular, triangular, hexagonal, or of another geometric shape that includes at least one straight "locking" edge for locking position of suspension bracket 101 horizontally parallel with the tire surface plane.

Pin 107 may be used to lock bracket stem 105 into mounting block 102 beneath the block so suspension bracket 101 cannot be lifted out of mounting block 102. The underside of suspension bracket 101 rests flush against the top surface of mounting block 102 when suspension bracket 101 is seated. Bend-stop stem 106 helps protect against deformity in suspension bracket 101 due to an object striking the mud flap 104 with enough force to bend the suspension bracket 101.

Mud flap 104 and suspension head 103 are considered one component wherein the suspension head 103 is designed to collapse and be pulled through the suspension slot 109. Once suspension bracket 101 is secured into the seat in mounting block 102, mud flap 104 may be placed through suspension slot 109 and may be suspended over the bracket by the suspension head 103. Locking rib 108 has a thickness at or just smaller than slot 109 to reduce the likelihood of the mud flap 104 coming back up through the suspension slot 109 after it is suspended. The directional arrows depict the direction of installation of suspension bracket 101 into mounting block 102 and mud flap 104 into suspension slot 109.

It will be apparent to one with skill in the art that the mud flap breakaway suspension system of the invention may be provided using some of or all the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

The invention claimed is:

1. A mud flap system, comprising:
a mounting device having a top, bottom, front, back and two opposing sides enabled to mount to a vehicle, the top including a walled recess extending into an inner volume of the mount and exiting out the bottom;
an elongated suspension bracket having a top, bottom and a proximal end to the recess, a distal end defining the length and a slot thru the top and bottom running along the length, the bottom having a stem at the proximal end enabled to be inserted into the recess extending past the bottom of the mounting device;
a mud-flap having a front, back, top with a width extending to a planar body having a bottom and two opposing edges, the top having a thickness greater than a thickness of the body;
wherein the mud flap is manufactured of pliant material, the bottom of the mud flap is inserted through the slot and the thickness at the top extends above the top of the suspension bracket and extends outside of boundaries formed by the slot which suspends the mud flap in the slot until force applied to the mud flap causes the thickness at the top to deform and pass through the slot thereby releasing the mud flap from the suspension bracket.

2. The mud flap assembly of claim 1, wherein the mud flap comprises a rib protruding under the top thickness along the width, the suspension bracket positioned between the top thickness and the rib of the mud flap, thereby locking the mud flap in position.

3. The mud flap assembly of claim 1, wherein the distal end of the stem includes a thru hole enabled to accept pinning hardware preventing the stem from leaving the recess.

4. The mud flap assembly of claim 1, wherein a bend stop stem protrudes from the bottom of the suspension bracket in a position between the stem and the slot.

5. The mud flap assembly of claim 1, wherein the thickness at the top extends past a front and back edge of the suspension bracket.

6. The mud flap assembly of claim 1, wherein the mud flap assembly is mountable to a vehicle behind at least one tire.

7. The mud flap assembly of claim 1, wherein the mud flap is fabricated from a flexible rubber, neoprene or rubber and polymer composite material.

8. The mud flap assembly of claim 1, wherein the top thickness of the mud flap is not damaged after being forced through the slot.

9. A method of suspending and detaching a mud flap, comprising the steps of:
(a) attaching a mounting device to a vehicle near a back side of a vehicle wheel;
(b) inserting a stem protruding from one end of an elongated suspension bracket into a recess formed at a top side of the mounting device, the stem exiting out a bottom of the mounting device;
(c) inserting a mud flap comprising a rib protruding under a top thickness along a width through a slot formed along a length of the suspension bracket positioned between the top thickness and the rib of the mud flap, thereby locking the mud flap in position in the slot via the thickness at a top edge of the mud flap being greater than a thickness of the slot;
(d) applying a force at the mud flap to dislodge the thickness at the top edge of the mud flap, forcing the thickness through the slot.

10. The method of claim 9, wherein a distal end of the stem includes a thru hole enabled to accept pinning hardware preventing the stem from leaving the recess.

* * * * *